United States Patent [19]

McGahan

[11] Patent Number: 5,252,003
[45] Date of Patent: Oct. 12, 1993

[54] ATTENUATION OF ARSENIC LEACHING FROM PARTICULATE MATERIAL

[75] Inventor: John F. McGahan, Knoxville, Tenn.

[73] Assignee: International Technology Corporation, Knoxville, Tenn.

[21] Appl. No.: 604,969

[22] Filed: Oct. 29, 1990

[51] Int. Cl.$^5$ .............................................. B09B 3/00
[52] U.S. Cl. .................... 405/128; 106/900; 423/87; 423/601
[58] Field of Search ............... 423/87, 140, 601, 602, 423/DIG. 20; 106/793, 800, 803, 900; 210/768; 405/128, 129, 263

[56] References Cited

U.S. PATENT DOCUMENTS

| | | | |
|---|---|---|---|
| 2,344,387 | 3/1944 | Berick | 106/105 |
| 4,118,243 | 10/1978 | Sandesara | 106/109 |
| 4,142,912 | 3/1979 | Young | 106/98 |
| 4,209,335 | 6/1980 | Katayama et al. | 106/89 |
| 4,338,134 | 7/1982 | Munster | 106/85 |
| 4,343,706 | 8/1982 | Etzel et al. | 210/667 |
| 4,548,718 | 10/1985 | Muir | 210/719 |
| 4,566,975 | 1/1986 | Allgulin | 210/711 |
| 4,622,149 | 11/1986 | Devuyst et al. | 210/717 |
| 4,723,992 | 2/1988 | Hager | 71/97 |
| 4,822,579 | 4/1989 | Wagner | 422/263 |
| 5,037,479 | 8/1991 | Stanforth | 106/691 |

FOREIGN PATENT DOCUMENTS

| | | | |
|---|---|---|---|
| 48592 | 4/1977 | Japan | 423/87 |
| 59627 | 5/1981 | Japan | 423/87 |
| 164639 | 9/1984 | Japan | 423/87 |
| 551250 | 5/1977 | U.S.S.R. | 423/87 |
| 914647 | 3/1982 | U.S.S.R. | 423/87 |

OTHER PUBLICATIONS

CRC Handbook of Chemistry and Physics, 57th edition, pp. B-119, B-127.
Fed. Reg. vol. 55, No. 106, Jun. 1, 1990, pp. 22556-22561.
Fed. Reg. vol. 55, No. 126, Jun. 29, 1990, pp. 26986-26998.
Baldwin, The Use of Arsenic as a Wood Perservative (pp. 99-110, see p. 102) Date unknown, Arsenic: 33AS74.9216, Van Nostrand Reinhold Co.
Krapf, Commercial Scale Removal of Arsenite, Arsenate, and Methane Arsonate from Ground and Surface Water (pp. 269-281, see p. 274), Arsenic 33AS 74.9216, Van Nostrand Reinhold Co.
Branz, et al., Immobilization of As, Cd, Cr, and Pb—Containing Soils Using Cement or Pozzolanic Fixing Agents (pp. 33-40) Date not known, Publisher unknown.

*Primary Examiner*—Randolph A. Reese
*Assistant Examiner*—John Ricci
*Attorney, Agent, or Firm*—Luedeka, Hodges, Neely & Graham

[57] ABSTRACT

The specification discloses a method for the treatment of particulate materials such as soils and sludges containing arsenic compounds which comprises contacting the material with a source of iron (III) ions and a source of magnesium (II) ions to stabilize the material against leaching of arsenic. A preferred source of iron (III) ions is iron (III) sulfate and a preferred source of magnesium (II) ions is magnesium oxide.

9 Claims, No Drawings

ATTENUATION OF ARSENIC LEACHING FROM PARTICULATE MATERIAL

The present invention relates to methods for the treatment of soils and other particulate materials containing hazardous or undesirable compounds and more particularly relates to a method for the treatment of materials containing arsenic compounds to stabilize the material against leaching of arsenic.

The problem of the contamination of soils, sludges and other particulate materials with heavy metals such as mercury, lead or arsenic has become increasingly important in recent years. These heavy metals form poisonous compounds which, when taken into the human body, cause or are suspected to cause a variety of severe health problems including cancer, neurological impairment and birth defects.

In response to this problem, the U. S. Environmental Protection Agency has developed standards for the permissible level of heavy metals that may be present in the leachate from particulate materials. The treatment standard for arsenic leachability in non-wastewater matrices is 5 mg/l (ppm) arsenic in the leachate as determined by the toxicity characteristic leaching procedure (TCLP) according to the final rule making set forth at 55 Fed. Reg. 126, pp. 26,986-98 (Friday, Jun. 29, 1990), the disclosure of which is incorporated herein by reference. Soils and solids that result in an impermissible arsenic level in the leachate present a particularly difficult problem from a remediation standpoint because the arsenic may be in several different valence states and/or contain organoarsenic species.

Known techniques for addressing arsenic leaching problems include vitrification as well as incorporation within cement, silicates, asphalt and/or binder mixtures. Limitations associated with these techniques include expansion of the volume of material that must be disposed of, high energy requirements and relatively high cost in some cases. A recently proposed method involves incineration and/or chemical oxidation followed by co-precipitation and stabilization. This technique involves large water volumes for containing the oxidized arsenicals which are then co-precipitated with iron salts and stabilized with dolomitic lime. A significant drawback associated with this approach is that the precipitation and stabilization process is very pH dependent and is difficult to control even under optimum conditions. These and other advantages and drawbacks associated with known methods for controlling arsenic leaching are described in 55 Fed. Reg. 106, pp.22556-61 (Friday, Jun. 1, 1990), which is incorporated by reference herein.

Accordingly, it is an object of the present invention to provide a method for the treatment of particulate materials such as soils or sludges containing arsenic compounds.

Another object of the invention is to provide a method for the treatment of particulate materials containing arsenic compounds to stabilize the material against leaching of arsenic.

A further object of the invention is to provide a method for the treatment of particulate materials containing arsenic compounds so that the material will pass regulatory standards for the leaching of arsenic.

Yet another object of the invention is to provide a method of the character described which employs commercially available equipment used to treat soils, sludges and other particulate materials.

Still a further object of the invention is to provide a method of the character described which may be carried out using readily available chemicals that have no significant adverse environmental effects.

An additional object of the invention is to provide a method of the character described which is effective for controlling arsenic leaching from a wide variety of particulate materials and which avoids drawbacks and limitations associated with previous methods.

The invention provides a method for the treatment of particulate materials such as soil or sludges containing organic or inorganic arsenicals. The method comprises contacting the material with a source of iron (III) ions and a source of magnesium (II) ions to stabilize the material against leaching of arsenic. A preferred source of iron (III) ions is iron (III) sulfate and a preferred source of magnesium (II) ions is magnesium oxide.

In the practice of the invention the contaminated particulate materials may be soils containing the typical inorganic constituents including silicon and iron-based compounds and mixtures thereof together with a varying amount of humus. The particulate materials may additionally constitute what is typically referred to as sludge, i.e., a thick, viscous mass which is usually a sedimented or filtered waste product. The particulate material may also be a combination or mixture of soil and sludge, and it may vary widely in moisture content from near zero percent moisture to an ooze or something approaching a slurry in consistency. For convenience, the method will be described hereinafter with reference to its application for the treatment of soil, it being understood that the method is subject to use for the treatment of a wide variety of other solid particulate materials.

As mentioned above, the arsenicals within the soil that are responsible for an excessive level of arsenic in the leachate may be organic and/or inorganic compounds of arsenic. Inorganic arsenicals that may be present include arsenic acid and arsenic oxides, and organic arsenicals likely to be encountered include methane arsenicals such as mono-methyl sodium arsenate, $Na(CH_3) AsO_2OH$, cacadylic acid, dichlorophenylarsine, and diethylarsine, to name a few. Although the mechanism of the invention is not fully understood, it is believed that the method accomplishes significant reductions in the level of arsenic in the leachant by initially converting arsenicals within the solids to As (V) forms of considerably lower solubility through the initial action of the iron (III) ion. Also, there is formed by the contact of the alkaline soil with the iron (III) ion an iron hydroxide floc which appears to complex with the converted arsenic compounds and has the ability to absorb or capture the arsenic compounds so that their loss to the surrounding solution is avoided. If the soil is not alkaline, the hydroxide forms on the addition of magnesium oxide. Magnesium (II) ion also provides compressive strength to the mixture following the iron (III) step and it helps to dry the mixture through formation of hydrous magnesium oxide resulting in an additional floc that further aids in precipitating and immobilizing converted arsenic compounds. Furthermore, addition of magnesium (II) as magnesium oxide buffers the final pH to no higher than about 9 so that the mixture is maintained slightly but not strongly alkaline. This avoids dissolution of inorganic arsenicals which can occur in strongly basic solutions owing to their amphoteric nature.

The method of the invention may be carried out in many ways according to the volume of the material to be treated, the availability of treatment equipment, and the feasibility of transporting the equipment to the material at the site. Generally speaking, in the case of relatively dry contaminated soil (moisture level below about 10 wt %) best results may be obtained by mixing the soil with a source of iron (III) ions such as a solution containing an iron (III) sulfate. The mixing is carried out for a period of time sufficient to achieve the necessary contact, usually at least about 5-10 minutes.

The amount of iron (III) ions needed will vary depending on the expected nature and amount of arsenic contamination within the material. Typically, where iron (III) sulfate is used, a range of from about 2 to about 10 parts iron (III) sulfate per part total measured arsenic will suffice to provide sufficient iron (III) ions. The concentration of iron (III) sulfate within the solution may vary from about 30 to about 50 wt %.

In some cases, such as when the material has a relatively high moisture content above about 40-60 wt % moisture, the source of iron (III) ions may be added dry to the material. It may be advantageous to add a drying and conditioning agent in some circumstances to facilitate blending of the materials. Fly ash is a relatively fine material of high absorbency which provides an excellent drying and conditioning agent for use in the invention.

After the ferric or iron (III) is added, the source of magnesium (II) ions is added, preferably as magnesium oxide. The magnesium oxide will form an iron (III) floc, if not already formed, and also forms a hydrous magnesium oxide upon contact with the water as explained above. Where magnesium oxide is used, the proportion of MgO to the arsenicals may range from about 1 to about 5 parts MgO per part total arsenic. The mixing of MgO with the other components is carried out for a sufficient period of time to ensure complete contact and for this purpose mixing over at least about 5-10 minutes will generally be adequate.

Mixing may take place in any variety of solids mixers such as a pug mill to achieve the necessary intermixing of material.

In some circumstances, the method may be carried out in situ by adding the reagents directly to the soil and mixing the components with a tiller or other such mixing device.

The method achieves considerable reductions in the amount of arsenic in the leachant from the particulate material, enabling the material to easily pass the TCLP test in most cases after only one treatment. For example, soils containing several thousand ppm total arsenic may have their TCLP extract reduced to less than 5 ppm arsenic as a result of the treatment. Also, the procedure used for the method is simple and does not require expensive or elaborate processing equipment. There is also no need for heating, so high energy consumption is avoided. Additionally, the procedure can be completed in a relatively short amount of time and no special operator training is required. The reagents are commercially available noncombustible chemicals with known properties and are relatively safe when used with ordinary precautions against personal exposure. In addition, the presence of the reagents within the treated material does not pose a significant adverse environmental effect so that the material may be safely returned to the site or to a landfill.

The following examples are provided to further illustrate various aspects of the present method but are not intended to limit the scope or coverage of the invention as set forth in the claims. Unless otherwise stated, all percentages are by weight.

EXAMPLE I

A soil sample was contaminated with arsenic compounds consisting of about 60 wt % organic arsenicals, mainly monosodium methylarsenate, and about 40 wt % inorganic arsenicals made up primarily of arsenic trioxide. The TCLP leachant from the soil contained in the neighborhood of 600 ppm arsenic. The sample was mixed with 40 parts by weight of 50% iron (III) sulfate (Ferric-Floc from Tennessee Chemical Co., containing 10.4 wt% iron [III]) for 5 minutes followed by addition of 8 parts by weight of magnesium oxide. The resulting mixture was stirred for 5 minutes and had a final pH of about 8. After treatment, the TCLP test showed a total arsenic leachate of about 7 ppm from the soil.

EXAMPLE II

A soil sample containing organic and inorganic arsenicals as described in Example 1 was characterized as a wet "gumbo clay" owing to its relatively high moisture level of about 50%. The pretreatment TCLP leachant was believed to contain at least about 600 ppm arsenic. The initial treatment step consisted of adding fly ash from a coal-fired boiler to dry and condition the soil to facilitate blending. The soil sample weighed 326 grams and the fly ash weighed 170 grams so the total sample weight after addition of the fly ash as 496 grams. The next step involved adding 90 grams of dry iron (III) sulfate monohydrate to the moist sample and mixing for about 5 minutes. About 40 grams of magnesium oxide were then mixed in over a period of about 5 minutes. Duplicate tests of total arsenic in the sample after treatment showed 1390 and 1420 ppm arsenic compounds. After the treatment the TCLP test showed 0.58 and 0.57 ppm arsenic in duplicate runs.

EXAMPLE III

A portion of the sample of "gumbo clay" from Example II weighing 686 grams was treated with 78 grams fly ash, 42 grams dry iron (III) sulfate monohydrate and 18 grams magnesium oxide as described in Example II. After the treatment, the TCLP test showed an arsenic level of 0.45 ppm in the extract.

The results of the above examples show that arsenic leaching in soil contaminated with large amounts of organic and inorganic arsenicals is rectified by the method of the present invention to provide a material of significantly improved environmental quality.

Although various embodiments of the present invention have been described in the foregoing detailed description, it will be understood that the invention is capable of numerous rearrangements, modifications and substitutions without departing from the scope and spirit of the appended claims.

I claim:

1. A method for the treatment of particulate materials containing arsenic compounds which comprises contacting the particulate material with a source of iron (III) ions and a source of magnesium (II) ions to stabilize the material against leaching of arsenic therefrom.

2. The method of claim 1 wherein the arsenic compounds comprise organic or inorganic arsenic compounds.

3. The method of claim 1 wherein an aqueous solution containing iron (III) sulfate is used as the source of iron (III) ions.

4. The method of claim 1 wherein an aqueous solution containing magnesium oxide is used as the source of magnesium (II) ions.

5. The method of claim 1, 2, 3 or 4 wherein the particulate material is contacted with a source of magnesium (II) ions after it is initially contacted with a source of iron (III) ions.

6. The method of claim 1 wherein the amount of arsenic in the leachate from the treated material is below about 5 mg/l as measured by TCLP.

7. A method for treating particulate materials such as soils, sludges and the like containing arsenic compounds which comprises:
   contacting the particulate material with an aqueous solution containing iron (III) sulfate to provide a mixture; and
   thereafter contacting the mixture with a source of magnesium (II) ions, whereby the degree to which arsenic leaches from the material is reduced.

8. The method of claim 7 wherein the arsenic compounds comprise organic or inorganic arsenic compounds.

9. The method of claim 7 wherein the amount of arsenic in the leachate from the treated material is below about 5 mg/l as measured by TCLP.

* * * * *